(12) United States Patent
Comparan et al.

(10) Patent No.: US 8,954,973 B2
(45) Date of Patent: *Feb. 10, 2015

(54) TRANSFERRING ARCHITECTED STATE BETWEEN CORES

(71) Applicant: International Business Machines Corporation, Armonk, NY (US)

(72) Inventors: Miguel Comparan, Rochester, MN (US); Russell D. Hoover, Rochester, MN (US); Robert A. Shearer, Rochester, MN (US); Alfred T. Watson, III, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/709,167

(22) Filed: Dec. 10, 2012

(65) Prior Publication Data

US 2013/0097411 A1  Apr. 18, 2013

Related U.S. Application Data

(63) Continuation of application No. 13/078,263, filed on Apr. 1, 2011.

(51) Int. Cl.
*G06F 9/46* (2006.01)
*G06F 9/30* (2006.01)
*G06F 9/48* (2006.01)

(52) U.S. Cl.
CPC .............. *G06F 9/30043* (2013.01); *G06F 9/46* (2013.01); *G06F 9/4856* (2013.01)

USPC ............................ 718/102; 718/104; 718/108

(58) Field of Classification Search
None
See application file for complete search history.

(56) References Cited

U.S. PATENT DOCUMENTS

| 5,913,059 | A  | * | 6/1999  | Torii ............................... 718/104 |
|---|---|---|---|---|
| 6,769,072 | B1 | * | 7/2004  | Kawamura et al. ............ 714/5.1 |
| 7,380,038 | B2 | * | 5/2008  | Gray ............................... 710/243 |
| 2005/0172164 | A1 | * | 8/2005  | Fox et al. ......................... 714/13 |
| 2005/0229184 | A1 | * | 10/2005 | Inoue et al. .................... 719/310 |
| 2008/0229312 | A1 | * | 9/2008  | May ............................... 718/102 |
| 2009/0013329 | A1 | * | 1/2009  | May et al. ...................... 719/313 |
| 2009/0157945 | A1 | * | 6/2009  | Arimilli et al. ............... 711/100 |
| 2012/0254877 | A1 |   | 10/2012 | Comparan et al. |

\* cited by examiner

*Primary Examiner* — Emerson Puente
*Assistant Examiner* — Dong Kim
(74) *Attorney, Agent, or Firm* — Patterson & Sheridan LLP

(57) ABSTRACT

A method and apparatus for transferring architected state bypasses system memory by directly transmitting architected state between processor cores over a dedicated interconnect. The transfer may be performed by state transfer interface circuitry with or without software interaction. The architected state for a thread may be transferred from a first processing core to a second processing core when the state transfer interface circuitry detects an error that prevents proper execution of the thread corresponding to the architected state. A program instruction may be used to initiate the transfer of the architected state for the thread to one or more other threads in order to parallelize execution of the thread or perform load balancing between multiple processor cores by distributing processing of multiple threads.

7 Claims, 8 Drawing Sheets

TRANSFERRING ARCHITECTED STATE BETWEEN CORES

CROSS-REFERENCED TO RELATED APPLICATIONS

This application is a continuation of co-pending U.S. patent application Ser. No. 13/078,263, filed Apr. 1, 2011. The aforementioned related patent application is herein incorporated by reference in its entirety.

BACKGROUND

The field of the invention generally relates to architected state and, more specifically to transferring architected state between processor cores.

The conventional mechanism for transferring a thread from a first processor or processing core to a second processor or processing core is to collect the architected state representing the current processing state of the thread, including intermediate data produced during execution of the thread and store the architected state to memory. A pointer to the location in memory where the architected state is stored is passed by the first processor or processing core to the second processor or processing core. The second processor or processing core then reads the architected state from the memory and processing resumes.

The thread transfer is initiated by software while the storing and reading of the architected state is performed by the processor or processor cores. After the architected state is read, the first or second processor or processing core informs the software that the transfer is complete and execution of the thread resumes. Latency is introduced during the thread transfer due to the interactions between the software and processors or processing core. Latency is also introduced by passing the architected state through the memory, especially when the available bandwidth between the processors or processor cores and memory is limited.

SUMMARY

The present invention generally includes a system, article of manufacture and method for transferring architected state directly between processor cores over a dedicated interconnect. The transfer may be performed by state transfer interface circuitry with or without software control. The architected state for a thread may be transferred from a first processing core to a second processing core when the state transfer interface circuitry detects an error that prevents proper execution of the thread corresponding to the architected state. A program instruction may be used to initiate the transfer of the architected state for the thread to one or more other threads in order to parallelize execution of the thread or perform load balancing between multiple processor cores by distributing processing of multiple threads.

According to one embodiment of the invention, a method, system and article of manufacture transfers architected state between a source processing core and a target processing core. At least a portion of the architected state associated with a thread executing within the source processing core is gathered. The gathered architected state is transmitted directly from the source processing core to the target processing core over a dedicated interconnect that bypasses any memory shared between the source processing core and the target processing core. The transmitted architected state is stored by the target processing core.

BRIEF DESCRIPTION OF THE SEVERAL VIEWS OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1A:
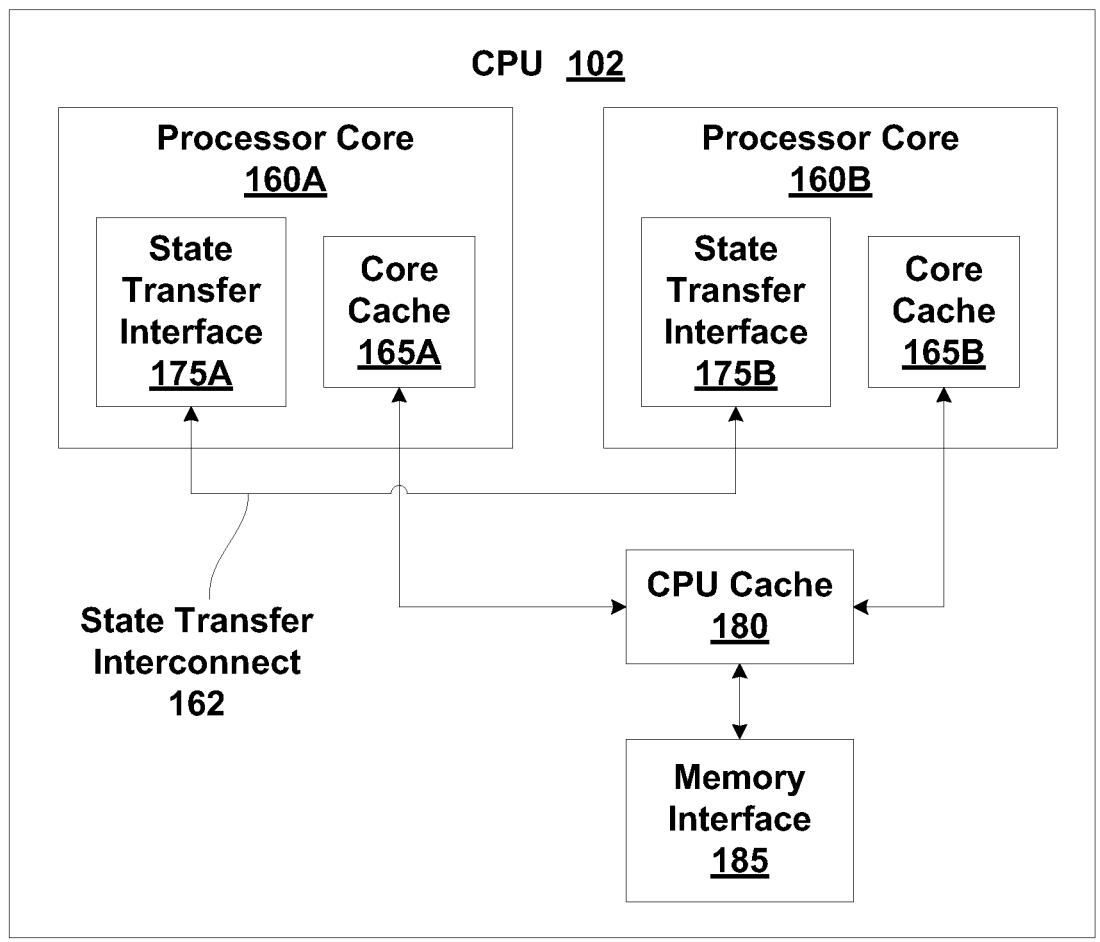
FIG. 1A depicts a block diagram of a CPU including multiple processor cores, according to an embodiment of the present invention.

The present invention generally includes a system, article of manufacture and method for transferring architected state directly between processor cores over a dedicated interconnect. The transfer may be performed by state transfer interface circuitry with or without software control. The architected state for a thread may be transferred from a first processing core to a second processing core when the state transfer interface circuitry detects an error that prevents proper execution of the thread corresponding to the architected state. A program instruction may be used to initiate the transfer of the architected state for the thread to one or more other threads in order to parallelize execution of the thread or perform load balancing between multiple processor cores by distributing processing of multiple threads.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud. For example, an application may execute on a computing system in the cloud and architected state corresponding to one or more processing threads may be directly transferred between processor cores over a dedicated interface. The architected state may be transferred to migrate a thread, clone a thread, parallelize execution of instructions, or balance a processing workload between multiple processor cores.

Referring now to FIG. 1A that depicts a block diagram of a Central Processing Unit (CPU) 102 including multiple processor cores 160, according to an embodiment of the present invention. The CPU 102 may be configured to execute multiple threads and may include a data cache 180 and a memory interface 185. The CPU cache 180 stores data that is frequently accessed by one or more of the processor cores, two such processor cores 160-B are shown; also separately (and collectively) referred to as processing core(s) 160. Data read from memory is stored in the CPU cache 180 via the memory interface 185 when the data is requested by a processing core. When data is evicted from the CPU cache 180, the data is written back to the memory via the memory interface 185.

Each processing core 160 includes a state transfer interface 175 and may include a core cache 165 that is configured to store frequently accessed data. The state transfer interface 175A and 175B are configured to gather architected state for a thread executed by the processing core 160A and 160B, respectively, and transmit the architected state via a state transfer interconnect 162. The architected state is stored in a register file or other local memory within each processing core 160A and 160B. The state transfer interconnect 162 enables processing core 160A to transfer architected state directly to the processing core 160B and enables the processing core 160B to transfer architected state directly to the processing core 160A. Importantly, the architected state bypasses the conventional path used to transfer data between each processing core 160 and the CPU cache 180 and/or memory. Therefore, the latency introduced during the transfer of the architected state through the state transfer interconnect 162 is reduced compared with a conventional operation that transfers data from one processing core to another processing core through either a shared cache or memory. Additionally, the state transfer interface 175 may be configured to automatically gather and transfer architected state when an error is detected or when a specific instruction is received by a processing core 160. The coordination between the circuitry of the state transfer interface 175 and software is reduced since the state transfer interface 175 may automatically transmit and receive the architected state and resume or begin processing a thread based on the received architected state.

Figure 1B:
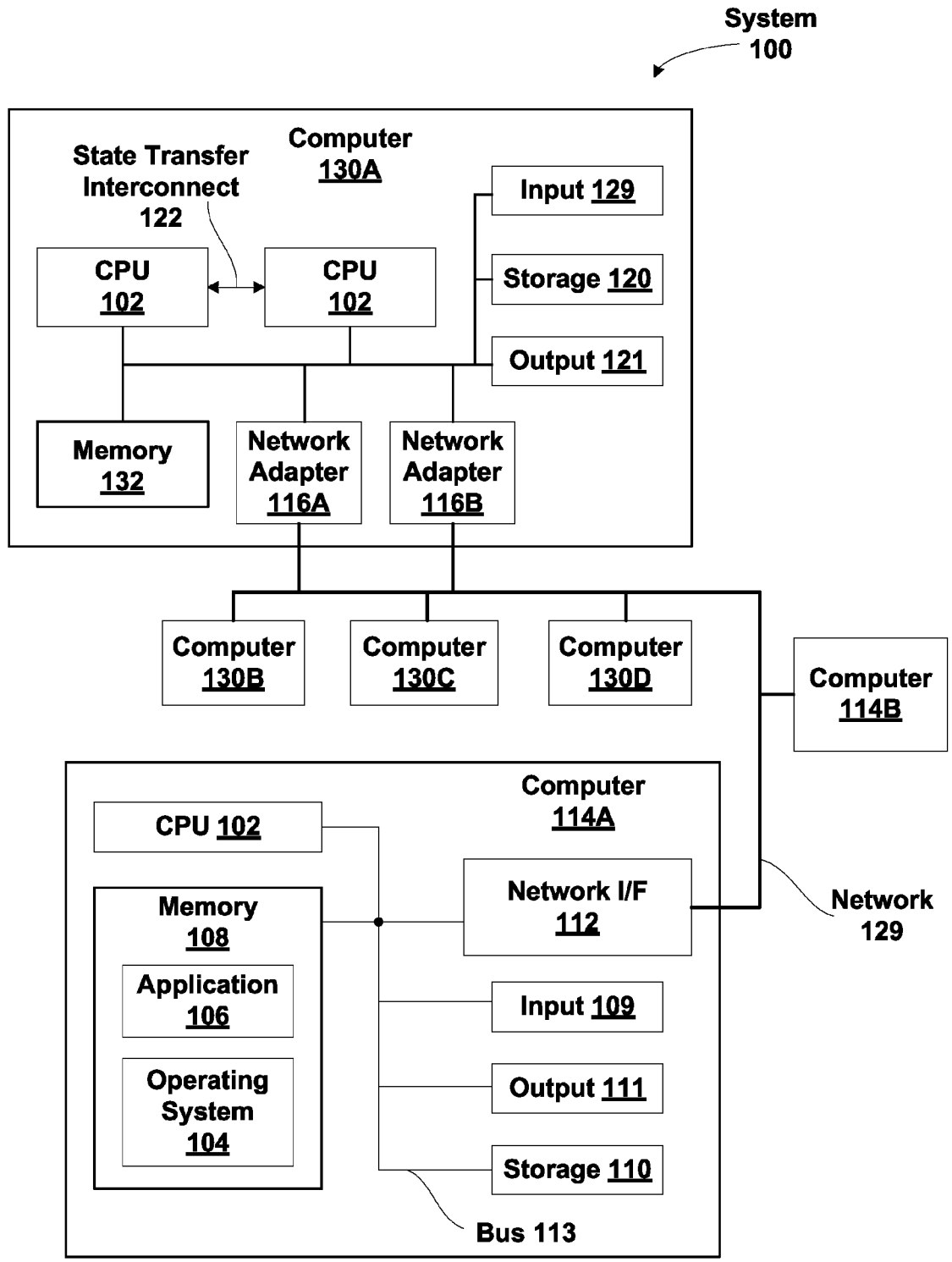
FIG. 1B depicts a block diagram of a system in which embodiments of the present invention may be implemented.

FIG. 1B depicts a block diagram of a system 100 in which embodiments of the present invention may be implemented. In general, the networked system 100 includes a client (e.g., user's) computer (two such client computers 114A-B are shown; also separately (and collectively) referred to as computer(s) 114) and at least one server computer (four such computers 130A-D are shown; also separately (and collectively) referred to as computer(s) 130. Computers generally are single devices with resources for computer processing, including processors, memory and storage.

Computer 114A and computer 130A are representative of one particular embodiment of a client and server, respectively. The computer 114A and computer 130A are connected via a network 129. In general, the network 129 may be a local area network (LAN) and/or a wide area network (WAN). In a particular embodiment, the network 129 is the Internet. Computers 130 may be network servers, web servers, or any other computer that uses a network adapter (NA) 116, e.g., NA 116A-B to communicate with computers 114 and other computers 130 over network 129.

The computer 114A includes CPU 102 connected via a bus 113 to a memory 108, storage 110, an input device 109, an output device 111, and a network interface device 112. The input device 109 can be any device to give input to the computer 114A. For example, a keyboard, keypad, light pen, touch-screen, track-ball, or speech recognition unit, audio/video player, and the like could be used. The output device 111 can be any device to give output to the user, e.g., any conventional display screen or set of speakers, along with their respective interface cards, i.e., video cards and sound cards (not shown). Although shown separately from the input device 109, the output device 111 and input device 109 could be combined. For example, a display screen with an integrated touch-screen, a display with an integrated keyboard, or a speech recognition unit combined with a text speech converter could be used.

The network interface device 112 may be any entry/exit device configured to allow network communications between the computer 114A and the computers 130 via the network 129. For example, the network interface device 112 may be a network adapter or other network interface card (NIC).

Storage 110 is preferably a Direct Access Storage Device (DASD). Although it is shown as a single unit, it could be a combination of fixed and/or removable storage devices, such as fixed disc drives, floppy disc drives, tape drives, removable memory cards, or optical storage. The memory 108 and storage 110 could be part of one virtual address space spanning multiple primary and secondary storage devices.

The computer 114A is generally under the control of an operating system 104, which is shown in the memory 108. Illustrative operating systems, which may be used to advantage, include Linux® and Microsoft Windows®. Linux is a trademark of Linus Torvalds in the US, other countries, or both.

The memory 108 is preferably a random access memory sufficiently large to hold the necessary programming and data structures of client applications. While the memory 108 is shown as a single entity, it should be understood that the memory 108 may in fact comprise a plurality of modules, and that the memory 108 may exist at multiple levels, from high speed registers and caches to lower speed but larger DRAM chips.

Illustratively, the memory 108 includes an application 106 that, when executed on CPU 102, provides support for exchanging information between the various servers 130 and locating network addresses at one or more of the servers 130. In one embodiment, the application 106 is a browser that includes a web-based Graphical User Interface (GUI), which allows the user to navigate and display web-pages located on the Internet. However, more generally the application may be a thin client application configured to transfer data (e.g., HTML, XML, etc.) between the computer 114A and the computers 130 via, for example, HTTP.

Like computer 114A, computer 130A may also include a memory 132, an input device 129, an output device 121, and a storage 210, that are similar to memory 108, input device 109, output device 111, and storage 110, respectively. Each of the CPUs 102 may also be configured to execute multiple threads and may be coupled to each other via a state transfer interconnect 122 so that architected state may be transferred directly from a processing core in a CPU 102 to a core in the other CPU 102.

Figure 2A:
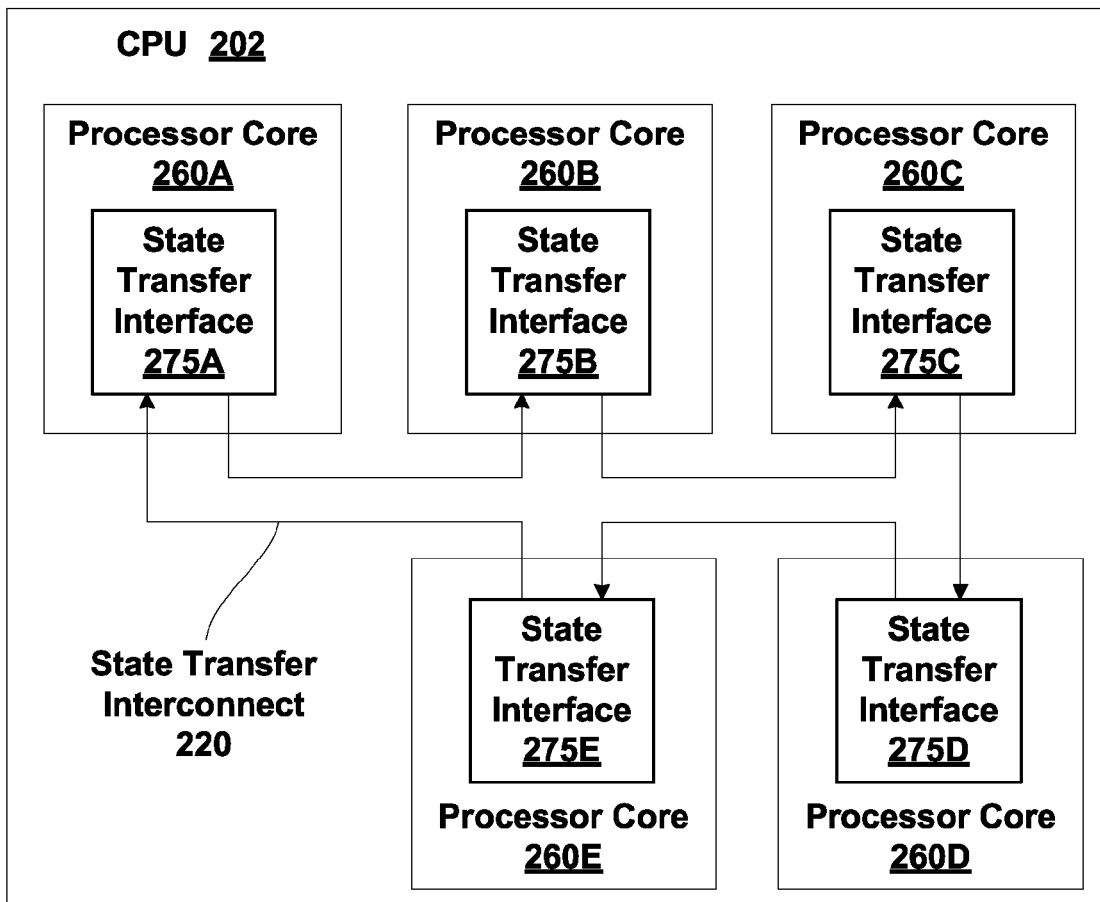
FIG. 2A depicts a block diagram of a CPU including multiple processor cores connected in a ring topology, according to an embodiment of the present invention.

FIG. 2A depicts a block diagram of a CPU 202 including multiple processor cores 260 connected in a ring topology, according to an embodiment of the present invention. When configured in a ring topology, the state transfer interconnect 220 transmits the architected state from a first processing core 260 to one or more other processor cores in the CPU 102. For example, the state transfer interface 275A within the processing core 260A may gather the architected state corresponding to a first thread. The state transfer interface 275A may transmit the architected state to a particular one of the other processor cores, 260B, 260C, 260C, or 260D, via the state transfer interconnect 220. The architected state may be transmitted to only one of the other processor cores 260 to migrate processing of the corresponding thread to another processing core 260 an error is detected by the processing core 260A. Examples of errors include corruption of a data cache or memory page that may be detected through parity checking.

The thread may be migrated to one or more of the processor cores 260 that is configured as a spare processing core or that is executing a low priority thread instead of being migrated from the processing core 260A to a particular one of the other processor cores 260. The state transfer interface 275A may transmit the architected state via to the state transfer interconnect 220 and one or more of the spare processor cores 260 may receive and store the architected state. Similarly, a processing core 260 that is executing a low priority thread may suspend execution of the low priority thread in order to receive and store the architected state of the processing core 260A.

A thread may be transferred from the processing core 260A to multiple other processor cores 260 in order to clone the thread and parallelize processing of a sequence of program instructions, such as a loop or sequence of instructions that can be independently executed using one or more different inputs. A thread may also be transferred from the processing core 260A in order to balance the processing workload between the processor cores 260. A ring topology is particularly well-suited for broadcasting the architected state from one processing core 260 to multiple other processor cores 260. Arbitration of transmissions over the state transfer interconnect 220 that is configured in ring topology may be controlled by software or the state transfer interconnect 220 circuitry to ensure that only one source processing core is sending architected state over the ring topology at a time.

Figure 2B:
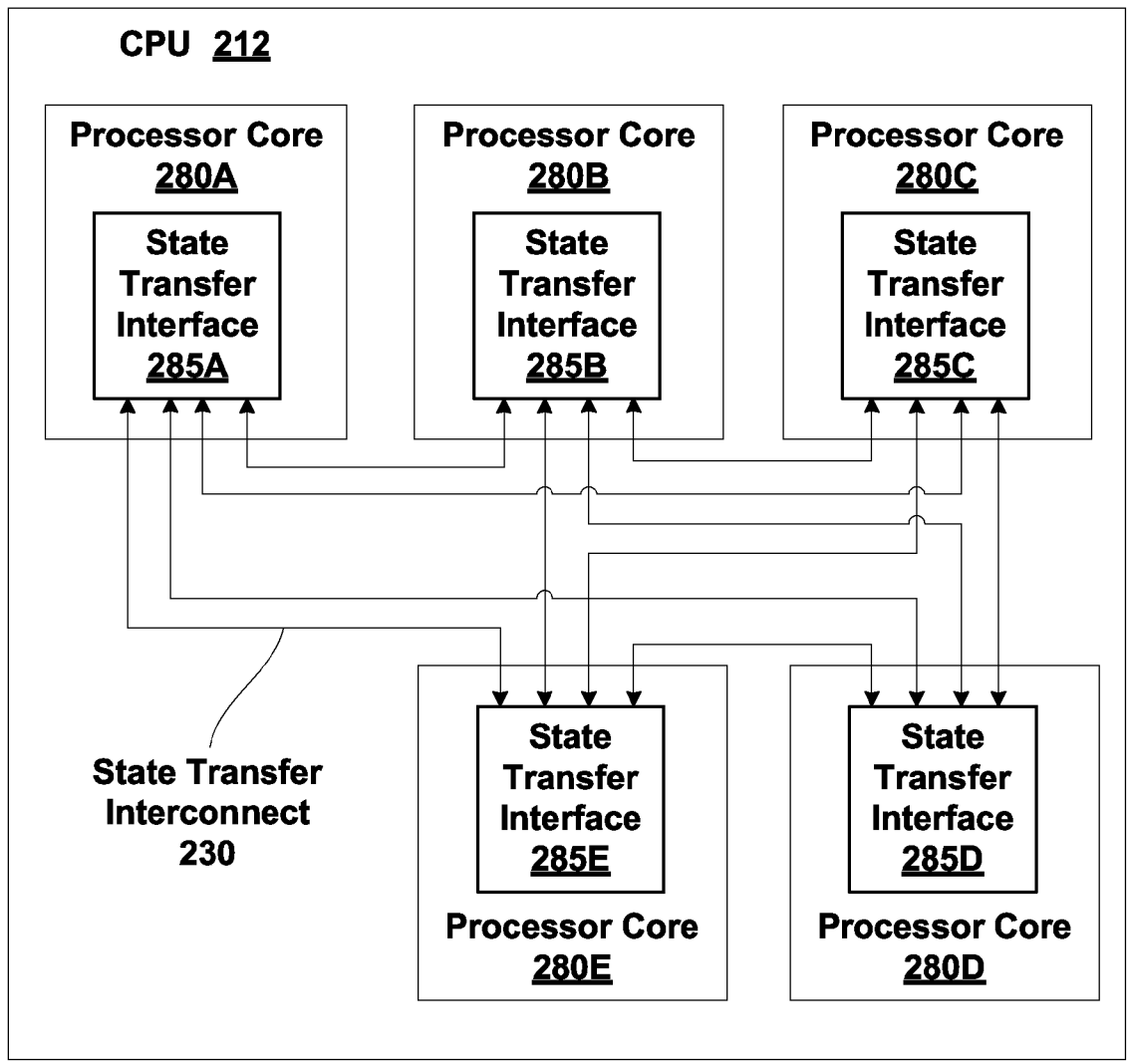
FIG. 2B depicts a block diagram of a CPU including multiple processor cores connected in a mesh topology, according to an embodiment of the present invention.

FIG. 2B depicts a block diagram of a CPU 212 including multiple processor cores 280 connected in a mesh topology, according to an embodiment of the present invention. The mesh topology differs from the ring topology since each processing core 280 within the CPU 212 is directly coupled to every other processing core 280 within the CPU 212, whereas in the ring topology each processing core 260 is directly coupled to two other processor cores 260 (one incoming and one outgoing) and is indirectly coupled to the remaining other processor cores 260. However, in either topology, the state transfer interconnects 220 and 230 provide a path between the processor cores 260 and 280, respectively, that bypasses a shared cache or memory.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. Reference will be made to elements introduced above and described with respect to FIGS. 1A, 1B, 2A, and 2B.

Figure 3:
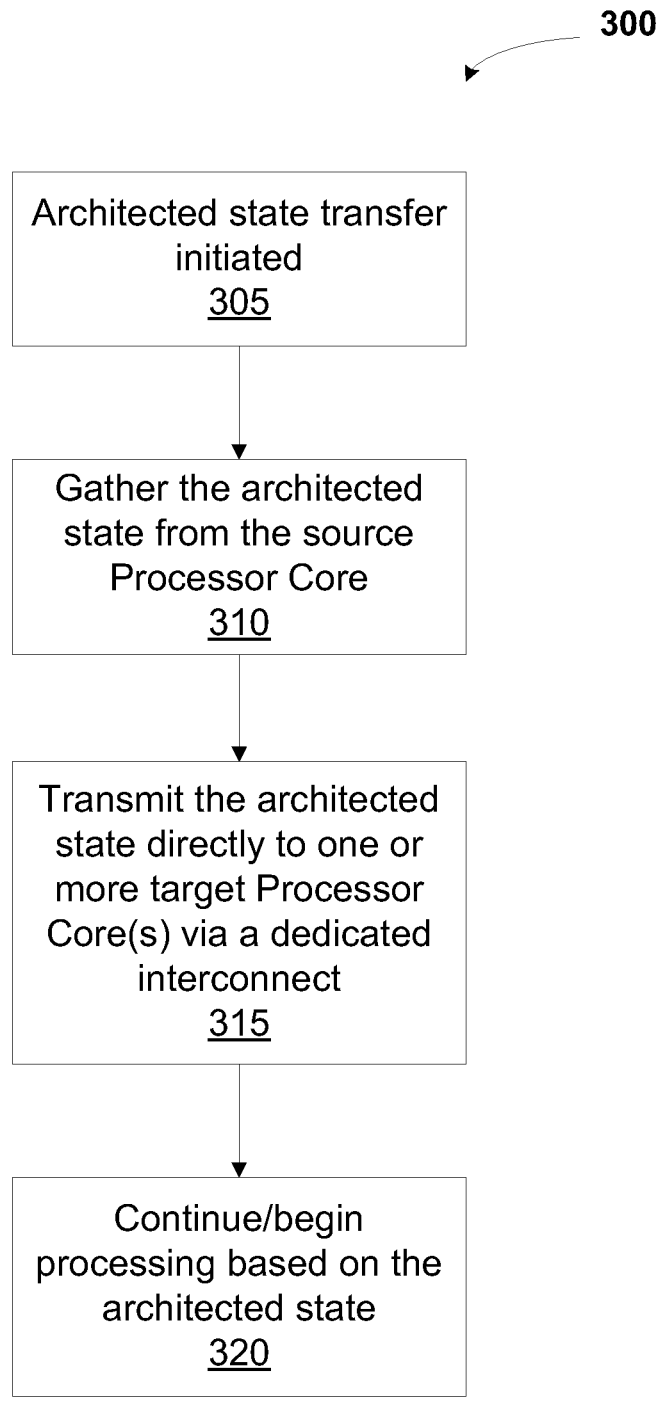
FIG. 3 is a flowchart illustrating a method for transferring architected state between processor cores, according to an embodiment of the present invention.

FIG. 3 is a flowchart 300 illustrating a method for transferring architected state between processor cores 160, 260 or 280, according to an embodiment of the present invention. At step 305, a transfer of architected state is initiated. The transfer may be initiated by the state transfer interface circuitry within a processing core or by an application program. At step 310, the state transfer interface gathers the architected state from the source processing core (one of processor cores 160, 260, or 280) that the state transfer interface is included within. At step 315, the state transfer interface transmits the architected state directly to one or more target processing core(s) via the state transfer interconnect, bypassing any shared caches or memories. At step 320 the architected state is stored within each one of the one or more target processing core(s) and processing continues or begins in the one or more target processing core(s) based on the architected state. Processing may continue in the source processing core.

Figure 4A:
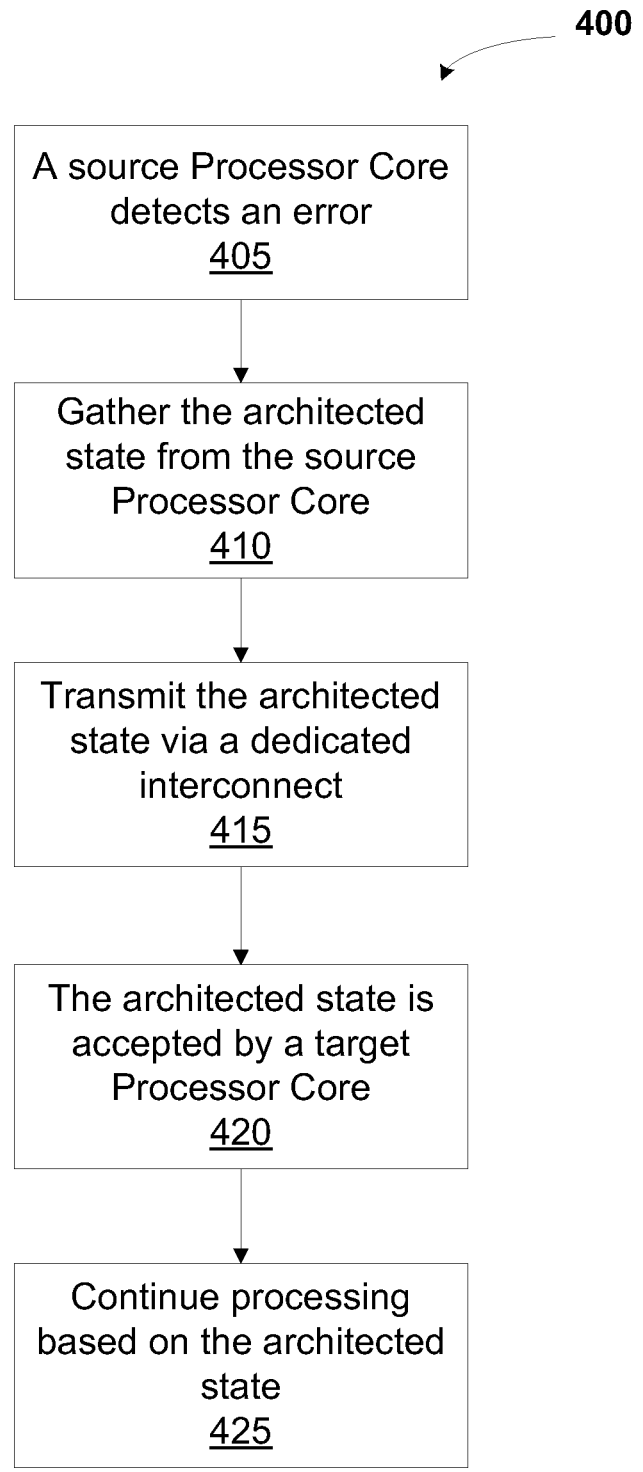
FIG. 4A is a flowchart illustrating a method for transferring the architected state corresponding to a thread when an error is detected, according to an embodiment of the invention.

FIG. 4A is a flowchart 400 illustrating a method for transferring the architected state corresponding to a thread when an error is detected, according to an embodiment of the invention. At step 405, the source processing core detects an error. The transfer is initiated by the state transfer interface circuitry without any interaction or communication with an application program. At step 410, the state transfer interface gathers the architected state from the source processing core that the state transfer interface is included within. At step 415, the state transfer interface transmits the architected state via the state transfer interconnect, bypassing any shared caches or memories. At step 420 the architected state is accepted by a target processing core in order to migrate processing of the thread from the source processing core to the target processing core. The target processing core may be a processing core that is configured as a spare processing core or that is executing a low priority thread. At step 425 processing of the thread continues in the target processing core that accepted the architected state.

Figure 4B:
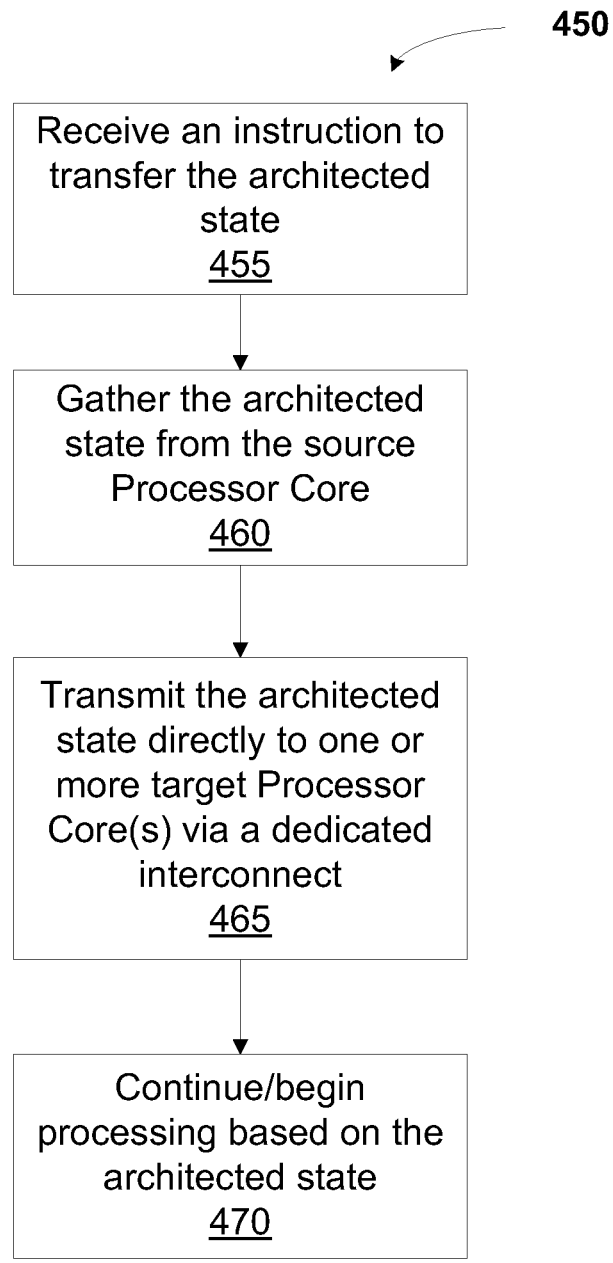
FIG. 4B is a flowchart illustrating a method for transferring the architected state corresponding to a thread when an instruction is received, according to an embodiment of the invention.

FIG. 4B is a flowchart 450 illustrating a method for transferring the architected state corresponding to a thread when an instruction is received, according to an embodiment of the invention. At step 455, a transfer of architected state is initiated when an instruction is received. The instruction may specify one or more threads or source processor cores and one or more target processor cores.

The transfer is initiated by an application program that includes the instruction. However, unlike a conventional transfer that is requires additional interactions with the application program or a software driver to gather the architected state and store the architected state to memory, the transfer is performed by the state transfer interface circuitry within a processing core.

At step 460, the state transfer interface gathers the architected state from the source processing core (one of processor cores 160, 260, or 280) that includes the state transfer interface in order to execute the instruction. At step 465, the state transfer interface transmits the architected state directly to one or more target processing core(s) via the state transfer interconnect, bypassing any shared caches or memories. At step 470 processing continues in the one or more target processing core(s) based on the architected state. Processing may continue in the source processing core. The method shown in FIG. 4B may be used to clone threads for parallel execution or to offload processing of one or more threads from a first set of processing core(s) to a second set of processing core(s). For example, the instruction may specify a count corresponding to the number of times that the thread should be cloned and may also specify one or more target processing core(s). In some cases, the parallelization or offloading may be initiated at the kernel level rather than by an application program.

Figure 5:
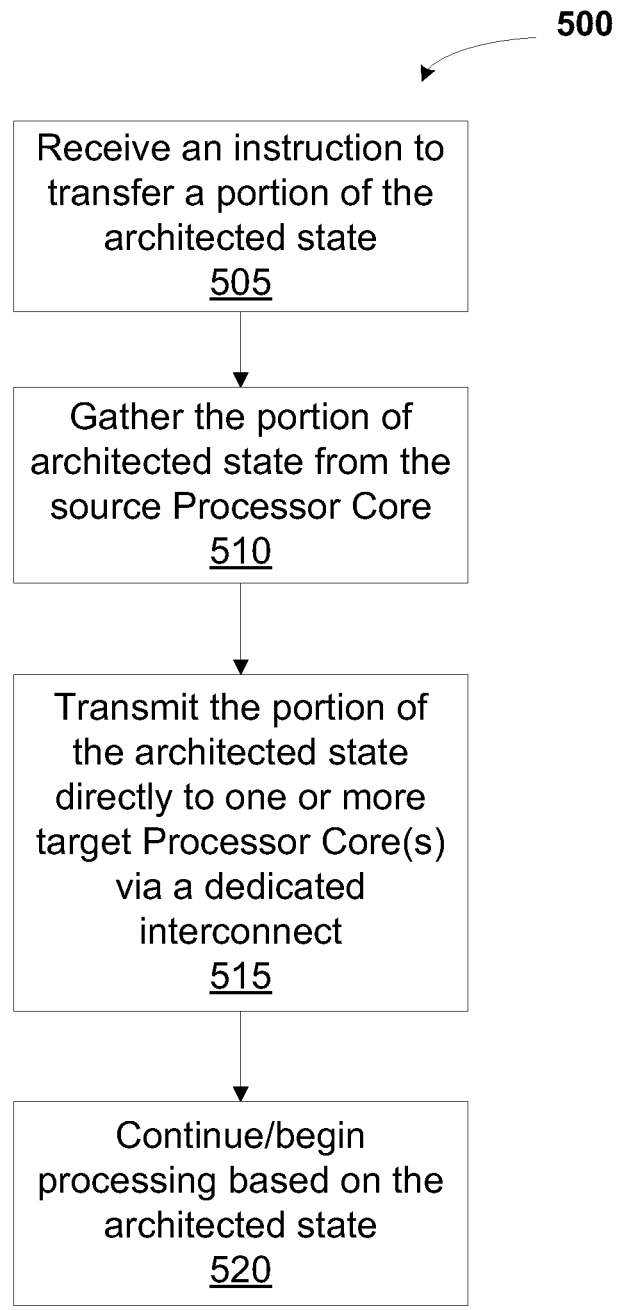
FIG. 5 is a flowchart illustrating a method for transferring a portion of the architected state corresponding to a thread when an instruction is received, according to an embodiment of the invention.

FIG. 5 is a flowchart 500 illustrating a method for transferring a portion of the architected state corresponding to a thread when an instruction is received, according to an embodiment of the invention. At step 505, a transfer of architected state is initiated when an instruction is received. The instruction specifies a portion of the architected state to be transferred. The portion may be defined using individual addresses or a range of addresses. The instruction may also specify one or more threads or source processor cores and one or more target processor cores. The transfer is initiated by an application program and performed by the state transfer interface circuitry within a processing core. All or a portion of the architected state may be transferred between processor cores to share data between different threads executing a program. An application program may transfer all or a portion of the architected state to execute a loop, when each pass through the loop can be independently executed. The results of the execution of the loop by the different target processor cores may be transferred back to the source processing core by each one of the target processor cores or the results may be stored to memory.

At step 510, the state transfer interface gathers the portion of the architected state from the source processing core (one of processor cores 160, 260, or 280) that the state transfer interface is included within in order to execute the instruction. At step 515, the state transfer interface transmits the portion of the architected state directly to one or more target processing core(s) via the state transfer interconnect, bypassing any shared caches or memories. At step 520 processing begins or continues in the one or more target processing core(s) based on the portion of the architected state. Processing may continue in the source processing core. The method shown in FIG. 5 may be used to share architected state between threads, clone threads for parallel execution, or to offload processing of one or more threads from a first set of processing core(s) to a second set of processing core(s).

When the architected state is transferred directly between processor cores over a dedicated interconnect instead of being transferred though a shared cache or memory the latency needed to transfer the architected state may be reduced. The latency may be further reduced when the transfer is initiated and performed by state transfer interface circuitry or when the transfer is initiated by a program instruction and performed by the state transfer interface circuitry. The architected state for a thread may be transferred from a source processing core to a target processing core when the state transfer interface circuitry detects an error that prevents proper execution of the thread corresponding to the architected state. A program instruction may be used to initiate the transfer of all or a portion of the architected state for the thread to one or more other threads in order to parallelize execution of the thread across multiple processor cores or perform load balancing between multiple processor cores. At least a portion of the architected state may be shared or provided to multiple threads by transferring the portion of the architected state from a source processing core to one or more target processor cores.

While the foregoing is directed to embodiments of the present invention, other and further embodiments of the invention may be devised without departing from the basic scope thereof, and the scope thereof is determined by the claims that follow.

What is claimed is:

1. A method of transferring state information, comprising:
   gathering at least a first portion and a second portion of state information associated with a thread executing within a source processing core, where said first portion of state information is stored in registers and said second portion of state information is stored in other local memory associated with the source processing core;
   broadcasting the first and second portions of the state information directly from the source processing core to a plurality of target processing cores over a dedicated interconnect that bypasses any memory shared between the source processing core and the target processing cores;
   storing, by each of the target processing cores, the first and second portions of the state information; and
   executing, by each of the target processing cores while the first thread executes on the source processing core, a second thread on the target processing core based on said portions of the state information, each of the second threads being a clone of the first thread.

2. The method of claim 1, further comprising initiating the transfer of the first and second portions of the state information when an error is detected by circuitry within the source processing core.

3. The method of claim 1, further comprising initiating transfer of the first and second portions of the state information when an instruction specifying one of the target processing cores is received by the source processing core.

4. The method of claim 1, further comprising:
   initiating transfer of the first and second portions of the state information when an instruction specifying one of the target processing cores and an additional target processing core is received by the source processing core;
   transmitting the first and second portions of the state information directly from the source processing core to the additional target processing core over the dedicated interconnect; and
   storing the first and second portions of the state information by the additional target processing core.

5. The method of claim 1, wherein the second portion of the state information is defined by a memory address range specified by an instruction that is received by the source processing core.

6. The method of claim 1, wherein one of the target processing core is configured as a spare processing core that accepts the first and second portions of the state information.

7. The method of claim 1, further comprising:
   initiating transfer of the first and second portions of the state information when an instruction specifying a count of target processor cores is received by the source processing core; and
   transmitting the first and second portions of the state information directly from the source processing core to additional target processor cores over the dedicated interconnect, wherein the quantity of the additional target processor cores and the target processing core equals the count.

* * * * *